United States Patent [19]

McCullough, Jr. et al.

[11] Patent Number: 4,868,038
[45] Date of Patent: Sep. 19, 1989

[54] CARBONACEOUS FIBER REINFORCED COMPOSITES

[75] Inventors: Francis P. McCullough, Jr.; Clarence R. Dick; Steven L. Brewster, all of Lake Jackson, Tex.

[73] Assignee: The Dow Chemical Company, Midland, Mich.

[21] Appl. No.: 112,794

[22] Filed: Oct. 23, 1987

[51] Int. Cl.$^4$ ............................................. B32B 9/00
[52] U.S. Cl. ................................ 428/222; 428/253; 428/254; 428/367; 428/371; 428/408
[58] Field of Search ............... 428/222, 367, 371, 408, 428/253, 254

[56] References Cited

U.S. PATENT DOCUMENTS 4,631,118 12/1986 McCullough et al. ............... 204/16
4,643,932 2/1987 McCullough, Jr. et al. ......... 428/97

Primary Examiner—Marion C. McCamish
Attorney, Agent, or Firm—John Lezdey; Joe R. Prieto

[57] ABSTRACT

The present invention is concerned with a composite material matrix of a synthetic or natural resin with a reinforcement of a multiplicity of lightweight, resilient shaped reforming elongatable, non-linear, non-flammable carbonaceous fibers. The fibers preferably have a sinusoidal or coil-like shape, a reversible deflection ratio of greater than 1.2:1 and an aspect ratio (1/d) greater than 10:1. The fiber-reinforced composite material of the present invention possess excellent impact resistance properties.

28 Claims, 2 Drawing Sheets

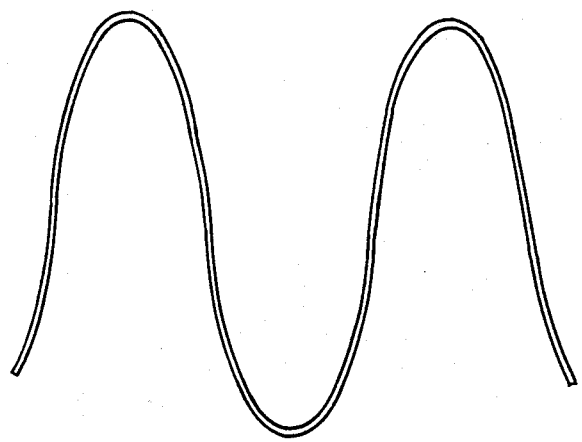
FIG. 1
FIG. 2
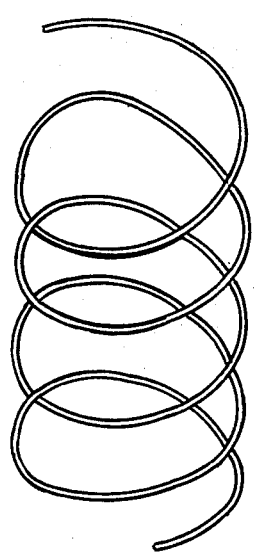
FIG. 3
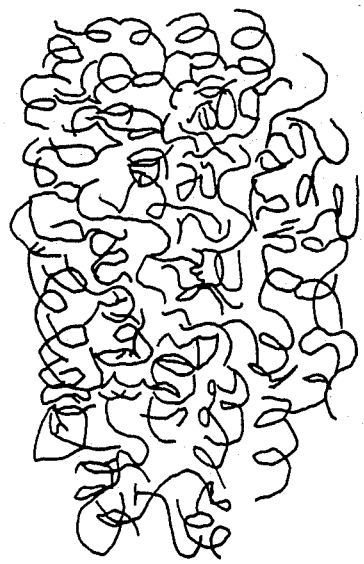

CARBONACEOUS FIBER REINFORCED COMPOSITES

BACKGROUND OF THE INVENTION

This invention relates to fiber reinforced composites containing fibers of a specified carbonaceous material as reinforcing fibers and a process for preparing the same. More particularly, this invention relates to carbonaceous fiber reinforced composite materials of a specified carbonaceous fiber in synthetic resins such as thermoplastic resin, thermosetting resin, or rubber matrixes.

Fiber reinforced composites are well known materials and have been used in many industrial fields such as in the aerospace and automotive industries. There has been a growing demand in these industries for the development of high performance composite materials, especially composite materials having high strength, high ridigity, vibration and/or high impact resistance.

It is known to form composites by including a reinforcing fiber in a synthetic resin matrix. For example, various reinforcing fibers and multifilament yarns and woven fabrics made from such fibers are known for reinforcing plastics. The reinforcing fibers include for example, carbon and graphite fibers, glass fibers, polyaramide fibers, silicon carbide fibers and metal fibers. The resin matrixes used with the reinforcing fiber material have included, for example unsaturated polyester resins, epoxy resins, phenol resins and polyimide resins.

Many of the composites of the prior art, while offering high strength and rigidity, do not provide sufficient vibration and/or impact resistance to form a satisfactory material for various end uses such as structural dampening, outer body panels of vehicles and aricraft or turbine blades. In addition, in many of the composites delamination occurs between the fiber and resin matrix when the composite is subjected to shear stresses, which may result in the composite failing in some uses.

It is desired to provide a novel composite material directed to a resin matrix reinforced with a carbonaceous fiber having excellent impact resistance and excellent adhesion to the resin matrix which does not delaminate or cause propagation of cracks when the composite is subjected to stresses and further having the following advantages over the prior art such as improved ability to take up the resin and be more easily and readily formed over complicated structural shapes prior to the addition of the resin.

SUMMARY OF THE INVENTION

The present invention is directed to a composition of a fiber reinforced composite material comprising a resin matrix and a multiplicity of non-linear carbonaceous materials which possess excellent impact resistance properties. More particularly, the present invention is concerned with a composite material comprising a resin matrix with a reinforcement of a multiplicity of lightweight, resilient shaped reforming elongatable, non-linear, non-flammable carbonaceous fibers, a reversible deflection ratio of greater than 1.2:1 and an aspect ratio (1/d) greater than 10:1.

BRIEF DESCRIPTION OF THE DRAWINGS

FIG. 1 is a perspective view of a filament of the invention with a sinusoidal configuration.

FIG. 2 is a perspective view of a filament of the invention with a coil-like configuration.

FIG. 3 is an enlarged view of a lightweight nonwoven fibrous mat of the invention.

DETAILED DESCRIPTION OF THE PREFERRED EMBODIMENTS

Figure 4:
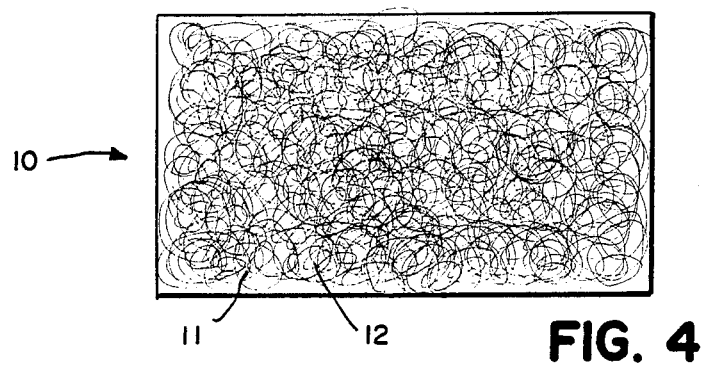
FIG. 4 is a cross-sectional view of a composite of the present invention utilizing the fiber in FIG. 1.

The present invention in its broadest scope is a composition comprising a resin matrix and a carbonaceous fiber. Composite materials reinforced with the carbonaceous fibers produced as described herein exhibit excellent vibration and/or impact resistance. Generally, the carbonaceous fiber is impregnated with a resin matrix in liquid form and solidified or cured by heat and pressure. The volume of fiber in the composite material is usually from about 5 to 80%, and more preferably from about 20 to 50%, by volume, although it can be varied appropriately depending on the particular purpose for which the composite is to be used.

The synthetic resin used in the compositions of the present invention may be selected from any of the conventional type resin materials such as thermoplastic resins, thermosetting resins and rubbers. There are several commercially available products of the above materials.

Thermoplastic resins, for example, may include polyethylene, ethylenevinyl acetate copolymers, polypropylene, polystyrene, polyvinyl chloride, polyvinyl acetate, polymethacrylate, acrylonitrilebutadiene-styrene copolymers (ABS), polyphenylene oxide (PPO), modified PPO, polycarbonate, polyacetal, polyamide, polysulfone, polyether sulfone, polyolefins, polyacrylonitrile, polyvinylidene chloride, polyvinyl acetate, polyvinyl alcohol, polyvinyl pyrrolidone, ethyl cellulose, polyvinyl chloridevinyl acetate copolymer, polyacrylonitrile-styrene copolymer, polyacrylonitrile-vinyl chloride copolymer, carboxymethylcellulose, etc., polyparaxylene, polyimide, polyamide-imide, polyester imide, polybenzimidazole, polyoxadiazole, and the like.

Thermosetting resins, for example, may include phenolic resins, urea resin, melamine resin, epoxy resin, alkyd resin, vinyl ester resins, polyester resin, xylene resins, furanic resins, and the like.

Rubbers, for example, may include natural rubber, silcone rubber, polychloroprene rubber, polyisoprene-isobutylene copolymers, styrene-butadiene copolymers, ethylene-propylene base copolymers ethylene butadiene block copolymers, butadiene-acrylonitrile copolymers, polyurethane and the like.

The composites of the present invention contain non-linear, non-flammable resilient elongatable carbonaceous fibers having a reversible deflection ratio of greater than about 1.2:1 and an aspect ratio (1/d) of greater than 10:1. In a preferred embodiment, the carbonaceous fibers possess a sinusoidal or coillike configuration or a more complicated structural combination of the two. Preferably, the carbonaceous fibers used and their method of preparation are those described in U.S. patent application Ser. No. 856,305, entitled "Carbonaceous Fibers with Spring-Like Reversible Reflection and Method of Manufacture," filed 4-28-86, by McCullough et al.; incorporated herein by reference and as described in U.S. patent application Ser. No. 918,738, entitled "Sound and Thermal Insulation," filed, 10-14-86, by McCullough et al.; incorporated herein by reference.

The carbonaceous fibers of this invention have a LOI value greater than 40 when the fibers are tested according to the test method ASTM D 2863-77. The test method is also known as "oxygen index" or "limited oxygen index" (LOI). With this procedure the concentration of oxygen in $O_2/N_2$ mixtures is determined at which a vertically mounted specimen-ignited at its upper end and just (barely) continues to burn. The width of the specimen is 0.65 to 0.3 cm with a length of from 7 to 15 cm. The LOI value is calculated according to the equation:

$$LOI = \frac{[O_2]}{[O_2] + [N_2]} \times 100$$

The LOI value of a number of fibers is as follows:

| | |
|---|---|
| polypropylene | 17.4 |
| polyethylene | 17.4 |
| polystyrene | 18.1 |
| rayon | 18.6 |
| cotton | 20.1 |
| nylon | 20.1 |
| polycarbonate | 22 |
| rigid polyvinyl chloride | 40 |
| oxidized polyacrylonitrile | greater than 40 |
| graphite | 55 |

The carbonaceous fibers of this invention are prepared by heat treating a suitable stabilized precursor material such as that derived from a fiber assembly of polymeric materials which can be made into a non-linear fiber or filament structures or configurations and are thermally stable. A suitable stabilized precursor material may be, for example, a material derived from a fiber assembly of stabilized polyacrylonitrile based materials or stabilized pitch (petroleum or coal tar) based materials. Preferably, the pretreated stabilized precursor material used in the present invention is derived from stabilized acrylic based filaments.

The precursor stabilized acrylic filaments which are advantageously utilized in preparing the fibers of the structures are selected from the group consisting of acrylonitrile homopolymers, acrylonitrile copolymers and acrylonitrile terpolymers. The copolymers preferably contain at least about 85 mole percent of acrylonitrile units and up to 15 mole percent of one or more monovinyl units copolymerized with styrene, methylacrylate, methyl methacrylate, vinyl chloride, vinylidene chloride, vinyl pyridine, and the like. Also, the acrylic filaments may comprise terpolymers, preferably, wherein the acrylonitrile units are at least about 85 mole percent.

The preferred precursor materials are prepared by melt spinning or wet spinning the precursor materials in a known manner to yield a monofilament fiber tow and the fibers or filaments yarn, tow, woven cloth or fabric or knitted cloth by any of a number of commerically available techniques, heated to a temperature above about 525 degrees C., preferably to above about 550 degrees C. and thereafter deknitting and carding the material to produce a fluff of the carbonaceous fibers which can be laid up in a battinglike form.

As one embodiment of the present invention and not to be limited thereby, the invention may described with reference to polyacrylonitrile based fibers. For example, in the case of polyacrylonitrile (PAN) based fibers, the PAN based fibers are formed by conventional methods such as by melt or wet spinning a suitable fluid of the precursor material. The PAN based fibers which have a normal nominal diameter of from about 4 to 25 micrometers are collected as an assembly of a multiplicity of continuous filaments in tows. The PAN based fibers are then stabilized, for example by oxidation or any other conventional method of stabilization in the conventional manner and the stabilized tows (or staple yarn made from chopped or stretch broken fiber staple) are thereafter, in accordance with the present invention, formed into a non-linear sinusoidal form by knitting the two or yarn into a fabric or cloth, recognizing that other shape forming methods, such as crimping and coil forming, combined with thermosetting, can be employed to produce the non-linear shape.

In the above enbodiment, the so-formed knitted fabric or cloth is thereafter heat treated, in a relaxed and unstressed condition, at a temperature of from about 525 to about 750 degrees C., in an inert atmosphere for a period of time to produce a heat induced thermoset reaction wherein additional crosslinking and/or a crosschain cyclization reaction occurs between the original polymer chain. At a lower temperature range of from about 150 to about 525 degrees C., the fibers are provided with a varying proportion of temporary to permanent set while in an upper range of temperatures of from 525 degrees C. and above, the fibers are provided with a permanent set. The heat treated fabric or cloth may be deknitted, if desired, to produce a tow or yarn containing the nonlinear fibers.

Specifically, what is meant by permanently set is that the fibers possess a degree of irreversibility. It is of course to be understood that the fiber or fiber assembly may be initially heat treated at the higher range of temperatures so long as the heat treatment is conducted while the non-linear configuration, such as coil-like and/or sinusoidal configuration, is in a relaxed or unstressed state and under an inert, non-oxidizing atmosphere.

As a result of the higher temperature treatment of 525 degrees C. and above, a permanently set sinusoidal (as illustrated in FIG. 1) or coil-like (as illustrated in FIG. 2) configuration or structure is imparted to the fibers or yarns, tows or threads. The resulting fibers, tows or yarns having the non-linear structural configuration may be used per se or opened to form a wool-like fluff. A number of methods known in the art can be used to create an opening, a procedure in which the yarn, tow or the fibers or filaments of the cloth are separated into a non-linear, entangled, wool-like fluffy material in which the individual fibers retain their coil-like or sinusoidal configuration yielding a fluff or batting-like body of considerable loft as shown in FIG. 3.

The stabilized fibers when permanently configured in accordance with the present invention into the desired structural configuration (as illustrated in FIG. 3), e.g., by knitting, and thereafter heating at a temperature of greater than about 550 degrees C. retain their resilient and reversible deflection characteristics. It is to be understood that higher temperatures may be employed of up to about 1500 degrees C., but the most flexible and smallest loss of fiber breakage, when carded to produce the fluff, is found in those fibers and/or filaments heat treated to a temperature from about 525 and 750 degrees C.

It is to be further understood that carbonaceous precursor starting materials may have imparted to them an electrically conductive property on the order of that of metallic conductors by heating the fiber fluff or the batting like shaped material to a temperature above about 1000 degrees C. in a non-oxidizing atmosphere. The electroconductive property may be obtained from selected starting materials such as pitch (petroleum or coal tar), polyacetylene, acrylonitrile based materials, e.g., a polyacrylonitrile copolymer (PANOX or GRAFIL-01), polyphenylene, polyvinylidene chloride resin (SARAN, trademark of The Dow Chemical Company) and the like.

The carbonaceous fiber material which is utilized in the composite structures of this invention may be classified into three groups depending upon the particular use and the environment that the structures in which they are incorporated are placed.

In a first group, the non-flammable non-linear carbonaceous fibers are non-electrically conductive and possess no anti-static characteristics.

The term non-electrically conductive as utilized in the present invention relates to a resistance of greater than $10^7$ ohms per inch on a 6K tow formed form precursor fibers having a diameter of about 7 to 20 microns.

When the precursor fiber is an acrylic fiber it has been found that a nitrogen content of 18.8% or more results in a non-conductive fiber.

In a second group, the non-flammable non-linear carbonaceous fibers are classified as being partially electrically conductive (i.e., having low conductivity) and have a carbon content of less than 85%. Low conductivity means that a 6K tow of fibers has a resistance of about $10^7$ to $10^4$ ohms per inch. Preferably, the carbonaceous fibers are derived from stabilized acrylic fibers and possesses a percentage nitrogen content of from about 10 to 20% for the case of a copolymer acrylic fiber, more preferably from about 16 to 18.8%, and up to about a maximum content of about 35% for a terpolymer acrylic fiber. The structures formed therefrom are lightweight, have low moisture absorbency, good abrasive strength together with good appearance and handle.

In a third group are the fibers having a carbon content of at least 85%. These fibers are characterized as being highly conductive. That is, the resistance is less than 10 ohms per inch and are useful in applications where electrical grounding or shielding are also desired.

The fibers of this invention may be used in substantially any desired fabricated form which will depend on the purpose for which the composite is to be used.

In one embodiment, the composite material may include the original thermally set knitted fabric containing the non-linear fibers. In another embodiment of this invention, the composite material may include the individual non-linear reinforcing carbonaceous fibers in the form of long or short fibers. The fiber generally can be from about 0.125 to about 2 inches in length. In still another embodiment, the non-linear fibers may be used in the form of a fiber assembly such as a yarn or tow composed of many filaments. In still another embodiment the fibers can be formed into a knitted cloth, for example, plain jersey knit, interlock, ribbed, cross float jersey knit or weft knit, and the like, or woven into a fabric, for example of plain weave, satin weave, twill weave, basket weave, and the like. The woven fabric may combine the non-linear carbonaceous fibers of the present invention, for example as warp, and other synthetic or natural fibers discussed below as the fill or visa versa. The fiber assembly may also be in the form of a non-woven material or fabric such as a mat, fluff or batting of fibers such as described above. In another embodiment the composite may include the woollike fluffy material produced from the thermally set knitted fabric which contains the non-linear fiber. This fluffy material or batting-like structure can also be a blend of the non-linear carbonaceous fibers of the present invention and other fibers as described below or various convention binders to add, for example stiffness and integrity to the batting structure.

As shown in FIG. 4, the invention provides a composite 10 which is formed from a fluff or batting or carbonaceous fibers 11 in an epoxy matrix 12.

Figure 5:
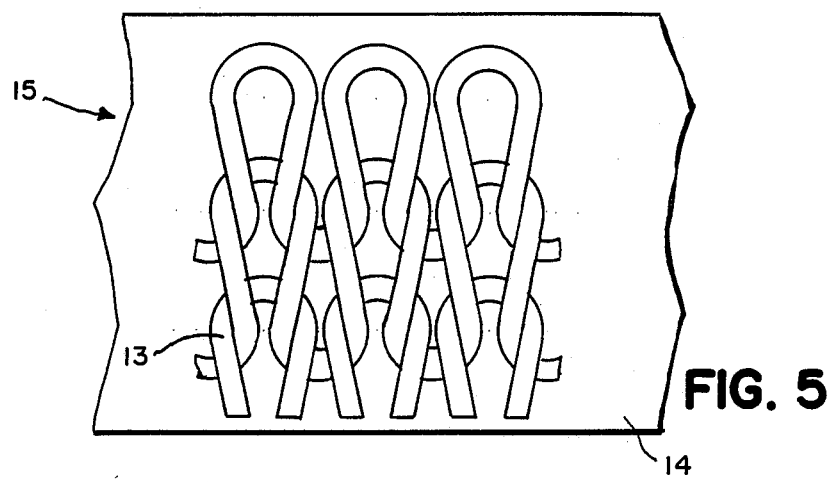
FIG. 5 is an enlarged top view of a composite comprising a flat jersey knit fabric in a resin matrix.
Figure 6:
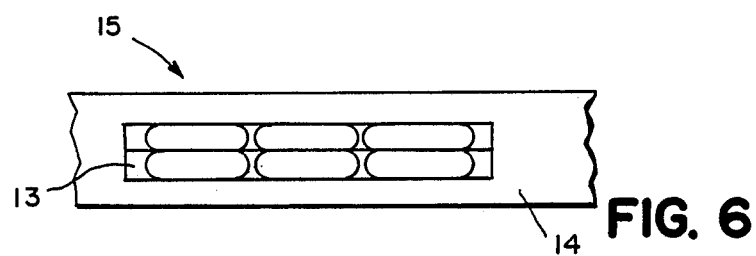
FIG. 6 is a cross-sectional view of a composite such as described in FIG. 5.

As shown in FIGS. 5 and 6, the composites 15 of the invention also can comprise a knit fabric layer 13 within an epoxy matrix 14.

Other fabricated items containing the non-linear carbonaceous fibers which can be readily formed by conventional equipment may include, for example, cloth such as herringbone weave cloth, twill weave tape, tubular woven fabric, paper, batts, blankets, roving, yarn, cord, rope, and non-woven structures.

The carbonaceous fibers of the present invention may be blended with other synthetic or natural fibers. Examples of the other reinforcing fibers that may be used include other carbonaceous or carbon fibers, cotton, wool, polyester, polyolefin, nylon, rayon, asbestos, glass fibers, fibers of silica, silica alumina, potassium titanate, silicon carbide, silicon nitride, boron nitride, boron, acrylic fibers, tetrafluoroethylene fibers, polyamide fibers, vinyl fibers, protein fibers, ceramic fibers, and oxide fibers such as boron oxide, thoria and zirconia. When a combination of fibers are used with the carbonaceous fibers of the present invention, from about 10 to about 99 percent by weight of the carbonaceous fibers can be used with from about 1 to about 90 percent by weight of the other reinforcing fiber. The blends are prepared and processed on conventional machinery.

Once the carbonaceous fibers or carbonaceous fiber assemblies of the present invention are produced, the fibers are incorporated into a resin matrix to produce various composite structures. The composite structures can be formed into substantially any fabricated form desired depending on its intended end use. For example, the fiber reinforced composite material of the present invention may be in the form of a sheet, a multi-layered assembly or a three-dimensional shaped article suitable for ultimate use. The fiber reinforced composite material can be advantageously produced by impregnating or coating a base material composed of the reinforcing fibers with the resin, by mixing and kneading the reinforcing fibers with the matrix resin, or by laminating the fibers and matrix resin. A fiber/resin matrix prepreg may also be formed. The operation of impregnation, coating, mixing and lamination can be carried out by conventional methods.

For example, in one embodiment of the present invention, an article from a composite under tension can be prepared using a reinforcing fiber tow or staple yarn prepared as described above. The fiber tow is stretched until taught and held in place by a conventional frame or jig. The stressed reinforcing tow or yarn is then impregnated with a thermoset resin such as an epoxy or DERAKANE (Trademark of The Dow Chemical Company) resin system and subsequently heat treated in order to polymerize or cure the resin system to form the resin/fiber composite.

The above composites are particularly useful for sports and recreation equipment. Examples of items that can be manufactured from the composite materials of the present invention include fishing poles, sail boat masts, tennis rackets, golf club shafts, baseball bats and the like. Other plastic items where strength, flexibility and corrosion resistance are desirable could be made utilizing the composites of this invention.

In another embodiment of the present invention, a three-dimensional shaped composite structure comprising a thermosetting or thermoplastic resin and the carbonaceous fibers of this invention can be made substantially more readily than heretofore using standard techniques known in the art. When the longer, more flexible carbonaceous fibers of the present invention are incorporated into thermoplastic and thermosetting resin systems, the flexible fibers will process at much greater lengths than traditional carbon fibers and consequently, the composite material will have higher strengths at equivalent fiber loadings, and the ability to bend in a tighter arc (shaper angle) than other reinforced carbon composite systems. It is believed that the coil-like or sinusoidal shaped carbonaceous fibers allows the fibers increased processability that other straight fibers.

Depending on the particular purpose for which the composite material of this invention is to be used, if desired the composite may include additives such as fillers, pigments, fire retardants, light stabilizers, and antioxidants. Specific examples of the above additives are calcium carbonate, calcium silicate, silica, alumina, carbon black, and titanium oxide.

As will be apparent to those skilled in the art, the reinforcing fibers used in this invention may be subjected to a process to convert them into a usually available form such as a yarn-making process prior to combining with the resin. Or before combining with the resin matrix, the fiber may be treated with various treating agents, such as for reducing or improving bonding between the fiber and resin. In addition, the fibers may be coated with a coupling agent, a surface modifying agent or a resin such as an epoxy resin, before they are used to produce the composite material of the invention.

The composite material of this invention is particularly useful in the aerospace and automotive industries. In addition, in sheet-like form the composite material can be useful as various types of hoods, tents, or belt materials. Furthermore, by using suitable resins, the composite material of this invention may also be used as a shielding material for motors or power generators, or as electrical insulating materials as in printed boards.

It is understood that all percentages as herein utilized are based on weight percent.

The present invention is further illustrated by the following examples:

EXAMPLE 1

The fibers of this example were prepared following the general procedure disclosed in U.S. patent application Ser. No. 856,305. In this instance, 6K OPF (i.e., oxidized polyacrylonitrile fiber, 6000 filaments) Grafil-01 stabilized tow was knit on a flat bed knitting machine at a rate of 4 stitches/cm. The resulting fabric was then treated at a temperature of 573 degrees C. in an inert (nitrogen) atmosphere for a period of time (about 15 minutes).

A mixture consisting of 400 g of a first epoxy resin, D.E.R.* 383, 100 g of a second epoxy resin, D.E.R.* 732 and 68 g of an epoxy hardener, diamino cyclohexane TACTIX* H32 (*Trademark of The Dow Chemical Company) was prepared and stirred well. The mixture was then placed in an empty vacuum desiccator. The desiccator was evacuated for 15 minutes and then restored to atmospheric pressure. Evacuation and reequilibration with atmospheric pressure was carried out 3 times.

A small amount of the above resin mixture was poured onto a Mylar sheet and formed into a 10 inch $\times 10$ inch square. A single ply of the non-linear carbonaceous fiber containing knitted fabric of the present invention which was thermally set at 573 degrees C., measuring 10 inches $\times 10$ inches and weighing approximately 100 g, was placed on the resin and the resin worked into the knitted material with a steel roller until all the fibers were thoroughly wetted. Because of the unexpected affinity of the carbonaceous fiber for the resin mixture, and the immediate and surprising absorption of the resin into the carbonaceous fiber, it was necessary to continuously add small amounts of resin to various parts of the fabric surface in order to uniformly wet the surface with the epoxy formulation. When the fabric surface was considered to be thoroughly and uniformly wetted, a small amount of the resin formulation was poured onto the surface of the fabric and, with the steel roller, evenly distributed over the surface of the fabric. A second 10 inch $\times 10$ inch ply of the fabric was placed on top of the first ply and the above process of working resin uniformly into the fabric was repeated.

After 3 plies of the carbonaceous fiber fabric had been so treated, a second sheet of Mylar was placed on top of the epoxy-carbonaceous fiber composite. Excess resin was then removed from the composite by applying pressure while rolling a rigid plastic pipe (2 inch I.D.) over the top of the composite. Any air bubbles appearing on the surface were removed by running a straight-edge across the surface to push out bubbles. The upper Mylar sheet was fixed to a preparation bench with masking tape in such a manner so as to place downward pressure on the composite structure. After curing for 8 hours at room temperature, the composite was cured for 15 hours at 110 to 120 degrees C.

Comparative Example A

A fiber/resin composite was made following the same procedure of Example 1, except that seven 10 inch $\times 10$ inch plies of KEVLAR ®49 (Trademark of E.I. duPont de Nemours and Company) fiber were used. It was noted that the KEVLAR ® exhibited little affinity for the resin formulation.

Comparative Example B

A fiber/resin composite was made following the same procedure of Example 1, except that eight 10 inch $\times 10$ inch plies of woven graphite (Hysol Grafil/Textile Products, Fabric 4598) were used. It was observed that the graphite exhibited little affinity for the epoxy resin.

EXAMPLE 2

A fiber-resin composite was made following the procedure of Example 1, except that three 10 inch $\times 6$ inch plies of needle punched carbonaceous fiber of the present invention in non-woven mat form (550 degrees C.) were used. As observed with the knit fabric in Example 1, the non-woven mat demonstrated an unexpected capacity, or affinity, for the epoxy resin formulation. An example of structures effective where great resistance to delamination is required such as structural dampening applications or applications in high vibration environments was produced as follows: As in Example 1, a 6K OPF tow was knit into a plain jersey fabric, the fabric treated at approximately 573 degrees C. until it was thermally set. A portion of the deknit tow was cut into staple of about 14 to 17 cm nominal lengths. This so cut staple was opened on a Shirley opener then further processed on a Rando Webber machine, an air laying system for producing non-woven batting. The feed plate-combing roll were spaced at 12/1000 inch and dispersed into the chamber using a 1200 rpm setting on the fan. Approximately 15% by weight of polyester binder fiber was blended with opened non-linear carbonaceous fibers in the preblending section of the Rando Webber. The Resulting batting was passed through a Benz hot air oven held at a temperature of 2670 degrees C. at a rate of 2 m/min resulting in an oven time of about 1 minute. This was sufficient to achieve a light bonding of the carbonaceous fibers in the web. This structure was processed on a Hunter Fiber Locker to obtain a mechanical bonding by the needle punching process. The resulting structure was suitable as a reenforcement material.

EXAMPLE 3

In a similar manner to Example 1, a portion from the same knit fabric was heat treated at a temperature of 1550 degrees C. The cloth itself and the deknitted tow had a very high electrical conductivity. On carding 15 cm lengths of cut tow, a fluff containing fibers was obtained which had fiber lengths of 2.54 to 9.5 cm (1 to 3 inches) with average lengths of 5 cm (2 inches). Thus, carding of a deknitted continuous filament tow knitted fabric which has been subjected to a temperature of above 1000 degrees C. is still capable of producing a wool like fluff product. The fluff structure of this example and Example 1 are particularly useful in applications where electrical grounding and/or shielding together with high strength and modulus are required.

EXAMPLE 4

This example was carried out to visually determine the degree of bonding between fibers and the epoxy resin matrix of the composites prepared in Example 1 and Comparative Examples A and B.

A 10 inch×10 inch×¼ inch fiber-epoxy composite structure, prepared in Example 1 and Comparative Examples A and B, were subjected to the impact of various caliber hand gun projectiles of different muzzle velocity from a distance of 25 feet as described in Table I below. When the side of the composite of the present invention from which the bullets exited was examined, it was observed that no fibers protruded from the structure. Nowhere could individual fibers be distinguished from the matrix, both components appearing to have formed a completely homogeneous substance. The exit damage was limited to a circumference of about 1 inch and no deformation or cracking of the composite was observed outside this area. The impact of the bullet, although rupturing the composite, did not separate the fibers from the epoxy resin matrix. This observation indicates a high degree of bonding between the resin matrix and the fibers.

A 10 inch×10 inch×¼ inch KEVLAR ®-epoxy composite was tested as described above. When the exit points of the projectiles were visually inspected a large amount of ruptured fiber bundles clearly separated from the resin matrix were observed. The KEVLAR ® composite appeared to have "splintered", with a large deformation of the surface at the exit point, i.e. the bullet impact produced a blister-like formation on the exit point. In some cases, the upper rovings of the KEVLAR ® at the exit side were separated from the matrix ½ inch to 1 inch from the exit point, resulting in the appearance of cracking or delamination. The results allowed above are believed to be due to the poor adhesion between KEVLAR ® and the epoxy resin.

A 10 inch×10 inch x ¼ inch graphite-epoxy composite was tested following the procedure above. The results were very similar to those obtained when the KEVLAR ®-epoxy composites were tested. That is, much splintering and blister-like formation occurred at the projectile exit point. Again, the results obtained are believed to be due to the poor bonding between graphite fibers and polymer matrixes.

TABLE I

| Effect of Handgun Projectiles on Various Fiber-Epoxy Composites | | | |
|---|---|---|---|
| Composite Material | Projectile Calibre | Muzzle Velocity (ft/sec) | Results |
| Present Invention Composite | .22 (LR) | 1145 | No individual fiber visible, no deformation |
| Present Invention Composite | .357 Magnum | 1450 | No individual fiber visible, no deformation |
| KEVLAR ®/ Epoxy | .22 (LR) | 1145 | Rovings separate from matrix, severe deformation |
| KEVLAR ®/ Epoxy | .357 Magnum | 1450 | Rovings separate from matrix, severe deformation |
| Graphite/ Epoxy | .22 (LR) | 1145 | Did not pass through |
| Graphite/ Epoxy | .357 Magnum | 1450 | Rovings separate from matrix, severe deformation |

EXAMPLE 5

A carbonaceous fiber of the present invention in knit fabric form was prepared following the same procedure as in Example 1 except that the heat treatment temperature was 650 degrees C. The fabric was deknitted and the individual tows dipped into a 5-10% solution of polycarbonate in methylene chloride. The wet tows were dried to leave the tows impregnated with polycarbonate. Each tow was then chopped into lengths of 1 to 2 inches. The 1 to 2 inch lengths of polycarbonate-impregnated fiber were mixed with polycarbonate pellets in a hopper attached to an extruder such that the fiber comprised 1 to 2% of the hopper mixture. Subsequently, the mixture was extruded to produce long strands of fiber-filled polycarbonate which were black in color. The strands were then fed into a pelletizer to obtain the composite in pellet form.

EXAMPLE 6

Fiber-polycarbonate composites were prepared following the same procedure of Example 5 except that the fiber-polycarbonate strands were sampled prior to pelletization and subjected to a non-flammability test. The non-flammability of the material of this invention has been determined following the test procedure set forth in 14 CFR 25.853(b). The test was performed as follows:

A minimum of three 6 inch×3/16 inch diameter (15.24 cm×0.48 cm diameter) strands comprised of 1 to 2% carbonaceous fiber and 98 to 99% polycarbonate were conditioned by maintaining the specimens in a conditioning room maintained at 70 degrees±5 degrees F. temperature and 50%+5% relative humidity for 24 hours preceding the test.

Each specimen was supported vertically and exposed to Bunsen or Turill burner with a nominal I.D. tube adjusted to give a flame of 1½ inches (3.81 cm) in height. A calibrated thermocoupled pyrometer positioned in the center of the flame measured the temperature of the flame which was at about 1550 degrees F. The lower tip of the specimen was ¾ inch (1.91 cm) above the top edge of the burner. The flame was applied to the tip of the specimens for 12 seconds and then removed.

Pursuant to the test, the material was self-extinguishing. The average burn length did not exceed 8 inches (20.32 cm). The average after flame did not exceed 15 seconds and no flame drippings were observed.

Similar results may be achieved if the carbonaceous fiber is either derived from an acrylic precursor or a pitch based fiber.

EXAMPLE 7

A carbonaceous fiber in knit fabric form (500–600 degrees C.) is deknitted into individual tows possessing a sinusoidal or coil-like shape and a reversible deflection ratio of greater than 1.2:1. The tows are stretched to their maximum extension and fixed to the interior edges of a 4 inch×4 inch×⅛ inch stainless steel mold such that the tows are approximately ⅛ inch apart and such that the tows form two planes, a lower and an upper plane, at 90 degrees to one another. The mold is filled with polyethylene powder or pellets such as high density polyethylene (HDPE), linear low density polyethylene (LLDPE) or low density polyethylene (LDPE), and then compressed in a hot press of the type normally used for preparing thermoplastic placks or films, and at conditions normally used in such a process, for example, at a temperature of 90 degrees C. to 110 degrees C. and at a pressure of from 15,000 to 40,000 psig. After removal and cooling, the result is a prestressed polyethylene composite in which the fiber component possesses "stored" or potential energy.

EXAMPLE 8

A non-linear carbonaceous fiber-polyethylene composite, prepared following the procedure of Example 7, is placed near a flame of 1550 degrees F. As the polyethylene approaches its glass transition point temperature (Tg), the fiber contained in the composite reverts to its original sinusoidal configuration and pulls the polymer matrix away from the high temperature area thus reducing the likelihood of combustion.

EXAMPLE 9

An epoxy-fiber composite is prepared following the procedure of Example 2, except that the carbonaceous fiber is prepared at 750 degrees C., thus possessing a sufficiently low surface conductivity for static charge dissipation. After preparation, the composite structure is lightly sanded on its surfaces to ensure exposure of the conductive fibers. The resulting composite will readily dissipate a static charge. Moreover, because of the extensive entanglement of the non-woven conductive batting, there is always intimate contact between all conductive fibers and thus an electrical current can be passed through the composite. The low bulk density of the non-woven material which is about less than or equal to 0.25 lb/ft$^3$ will provide for anti-static properties with little or no significant weight gain. Moreover, rather than using 3 plies of the non-woven conductive mat, one ply could be used or plies of different thicknesses could be used to provide a conductive composite of the desired thickness and weight.

EXAMPLE 10

An anti-static composite is prepared following the procedure of Example 9, except that the carbonaceous fiber is in a knit fabric form and prepared at 750 degrees C. to render the fabric surface conductive or anti-static.

EXAMPLE 11

An epoxy-fiber composite is prepared following the procedure of Example 1, except that the fiber is prepared at a temperature of 1000 to 1500 degrees C. thus providing the fibers with a modulus of the order of 1 to 10 million lb/in$^2$ and a tensile strength of the order of 100,000 to 400,000 lb/in$^2$. The composite resulting from such preparation possesses the stiffness and toughness necessary to survive low velocity impacts. In addition the sinusoidal fiber in the composite absorbs energy from the impactor and limits the destruction produced by high velocity impacts. Thus, it is believed that the composite, when struck by a 0.357 Magnum bullet, fired from a distance of 25 feet, will tend to stop or deflect the bullet, and will not crack or break as compared to prior art epoxy composites, which splinter and deform badly upon experiencing such an impact.

EXAMPLE 12

The high modulus fibers are prepared as in Example 11. Before inclusion in the epoxy matrix, the fibers are treated with an agent such as silicone fluids to decrease the strength of the bond between the fiber and the matrix. The reduced bonding of the fibers to the resin matrix allows the fibers to dissipate the energy of the impactor more freely.

What is claimed is:

1. A fiber reinforced composite material comprising a synthetic resin matrix containing a multiplicity of reinforcing carbonaceous fibers, said reinforcing fibers comprising resilient shaped reforming elongatable non-linear non-flammable carbonaceous fibers, said fibers having a reversible deflection ratio of greater than 1.2:1 and an aspect ratio (1/d) of greater than 10:1.
2. The composite material of claim 1 wherein the fibers have a sinusoidal configuration.
3. The composite material of claim 1 wherein the fibers have a coil-like configuration.
4. The composite material of claim 1 wherein the resin is a thermosetting resin.
5. The composite material of claim 1 wherein the resin is a thermoplastic resin.
6. The composite material of claim 1 wherein the resin is a rubber.
7. The composite material of claim 1 wherein the composite material is in the form of a sheet.

8. The composite material of claim 7 wherein the thermoplastic matrix resin is a polycarbonate resin, a polyamide resin or thermoplastic saturated polyester resin.

9. The composite material of claim 1 wherein the composite material is in the form of a three-dimensional shaped article suitable for ultimate uses.

10. The composite material of claim 1 wherein the matrix resin is a polyethylene.

11. The composite material of claim 1 wherein said carbonaceous fibers are in the form of a yarn or tow.

12. The composite material of claim 1 wherein said carbonaceous fibers are in the form of a cloth or fabric.

13. The composite material of claim 1 wherein said carbonaceous fibers are continuous carbonaceous fibers.

14. The composite material of claim 1 wherein said carbonaceous fibers are in the form of a non-woven structure.

15. The composite material of claim 1 wherein the carbonaceous fibers are in the form of a batting.

16. The composite material of claim 15 wherein the batting has a bulk density of less than about 8 kg/m$^3$.

17. A composite material of claim 1 wherein the carbonaceous fiber has a limited oxygen index value greater than 40.

18. The composite material of claim 1 wherein the fibers are non-electrically conductive fibers.

19. The composite material of claim 1 wherein the fibers possess no anti-static characteristics.

20. The composite material of claim 1 wherein the fibers are electrically conductive.

21. The composite material of claim 1 wherein the fibers have a carbon content of less than 85%.

22. The composite material of claim 1 wherein the fibers have a carbon content of at least 85%.

23. The composite material of claim 1 wherein the fibers are derived from stabilized acrylic fibers.

24. The composite material of claim 1 wherein the carbonaceous fibers have a percent nitrogen content of from about 10 to 35%.

25. The composite material of claim 1 wherein the carbonaceous fibers have a nitrogen content of about 16 to 19%.

26. The composite material of claim 1, wherein the fibers have a bulk density of less than about 32 kg/m$^3$.

27. The composite material of claim 1 wherein the fibers are derived from stabilized polyacrylonitrile.

28. The composite material of claim 1 wherein the matrix resin is an epoxy.

* * * * *